NONRECIPROCAL ELASTIC WAVE COUPLING NETWORK

Filed July 14, 1964 2 Sheets-Sheet 1

INVENTOR
R. L. COMSTOCK
BY Roy M. Porter, Jr.
ATTORNEY

NONRECIPROCAL ELASTIC WAVE COUPLING NETWORK

Filed July 14, 1964 2 Sheets-Sheet 2

3,292,109
Patented Dec. 13, 1966

3,292,109

NONRECIPROCAL ELASTIC WAVE COUPLING NETWORK

Richard L. Comstock, Palo Alto, Calif., assignor to Bell Telephone Laboratories, Incorporated, New York, N.Y., a corporation of New York Filed July 14, 1964, Ser. No. 382,615
8 Claims. (Cl. 333—1.1)

Figure 1:
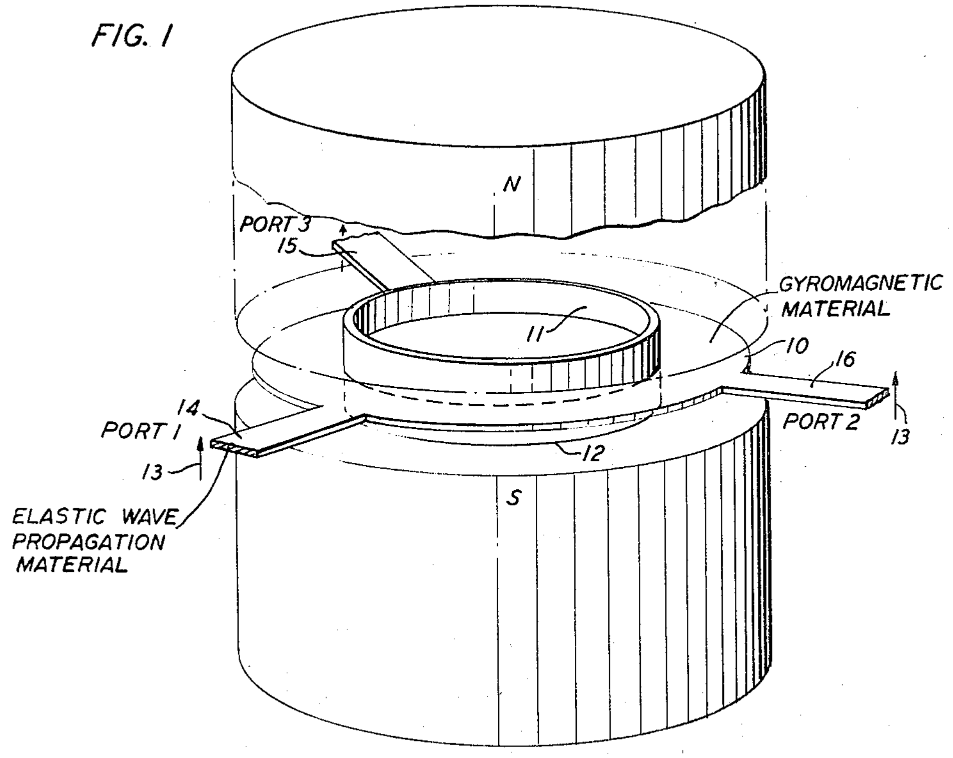

This invention relates to elastic wave transmission systems and more particularly to multiport elastic wave circuits having nonreciprocal transmission properties for use in said systems.

It is an object of the invention to establish nonreciprocal connections between a plurality of media each supporting wave energy in the form of elastic wave vibrations.

Recent advances in the device technology of elastic wave vibrations, referred to interchangeably in the art as ultrasonic or acoustical wave energy, have duplicated many of the components which have been found useful in the past in electromagnetic or microwave transmission systems. For example, different forms of elastic wave transmission media, amplifiers, detectors, wave generators, filters and transducers have been disclosed which have their counterparts in electromagnetic wave circuits.

One group of components that substantially advanced the electromagnetic wave transmission art utilized the nonreciprocal properties of gyromagnetic materials, most often ferromagnetic materials such as ferrites and magnetic garnets. Included in this group is the multiport network known as a circulator whose ports can be enumerated cyclically and which has the property that energy incident on any port is transmitted preferentially to the next enumerated port. When all but two adjacent ports are reflectionlessly terminated transmission between these ports is characteristic of a device referred to as an isolator. The numerous applications of both of these circuits for use with electromagnetic waves are well known, and the need for equivalent circuits in elastic wave systems is apparent.

It is therefore another object of the present invention to provide new and improved types of nonreciprocal elastic wave devices including circulators and isolators.

In accordance with the present invention it has been found that the standing wave pattern of a flexural mode of elastic wave vibration in a thin disk of gyromagnetic material is nonreciprocally displaced upon the disk when a magnetic field is applied to it. The displacement is attributed to magnetoelastic interactions within the disk. A principle feature of the present invention resides in elastic wave coupling to the standing wave pattern on such a disk at one or more points that coincide with nodal points in the displaced standing wave. The nonreciprocal nature of the displacement is much that when the pattern is excited at a first point, a node accurs at the second point, but when excited at said second point all nodes are remote from said first point. Thus, elastic wave energy is coupled from said first point to said second point but not from said second point to said first point. Such a nonreciprocal transmission characteristic is fundamental to both circulators and isolators. In one embodiment of the invention these principles are extended to a three-port network, each port being coupled to a nodal point produced by excitation at only one other port. When properly proportioned, the multiport network duplicates with elastic wave energy the characteristic typical of the circulator.

These and other objects and features, the nature of the present invention and its various advantages, will appear more fully upon consideration of the specific illustrative embodiments shown in the accompanying drawings and described in detail in the following explanation of these drawings.

Figure 2:
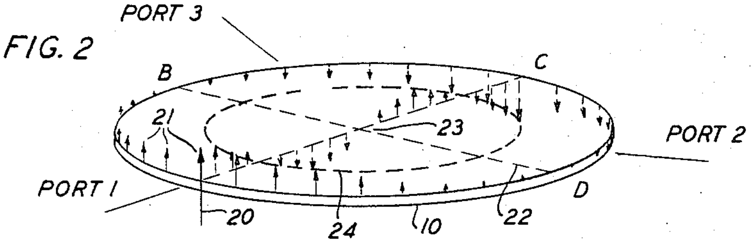
Figure 3:
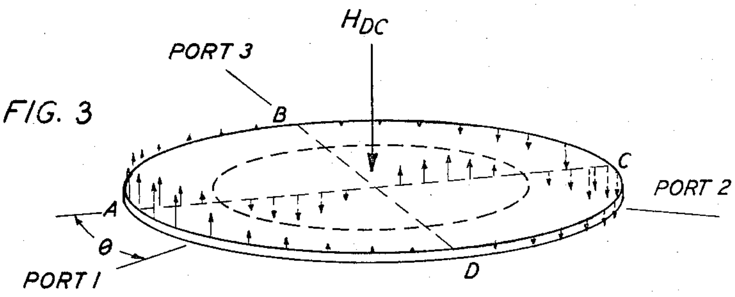
Figure 4A:
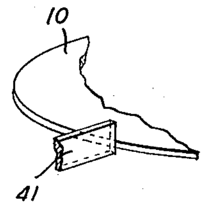
Figure 4B:
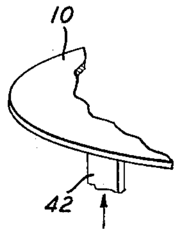
Figure 5A:
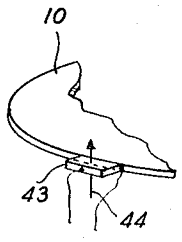
Figure 5B:
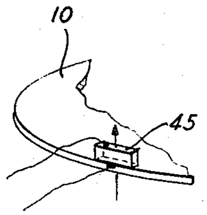

FIG. 1 is a perspective view of a three-port elastic wave circulator;

FIGS. 2 and 3, given for explanatory purposes, are schematic illustrations of the flexural mode standing wave pattern in an unmagnetized and magnetized disk of ferromagnetic material, respectively;

FIGS. 4A and 4B illustrate alternative input-output elastic wave coupling means for the embodiment of FIG. 1; and FIGS. 5A and 5B illustrate alternative input-output electrical coupling means for the embodiment of FIG. 1.

Referring more particularly to FIG. 1, an illustrative embodiment of a three-port elestic wave circulator is shown in perspective. The circulator comprises a thin disk 10 of single crystal or polycrystalline ferromagnetic material of the type exhibiting the gyromagnetic resonance phenomena in the range of frequencies of interest. Examples of suitable materials are the various ferrites such as lithium ferrite and the various magnetic garnets such as yttrium iron garnet and other rare earth garnets. According to one preferred embodiment disk 10 is cut from a single crystal of yttrium iron garnet (YIG) with the plane of the disk normal to the hard axis of magnetization of the material. This orientation is chosen only to avoid the effect of anisotropy of the material. Radius $a$ of disk 10 is in the order of one wavelength of the elastic wave in the material at the operating frequency, and its exact value will be defined hereinafter by Equation (2). The thickness $h$ of disk 10 is small, being many times less than radius a, so that thickness modes of vibration in disk 10 are suppressed when disk 10 is suitably supported and excited in its fundamental flexural mode.

Recognizing that this fundamental flexural mode has a nodal point at the disk center and a nodal circle about the center which are dead areas as will be shown in connection with FIG. 2, numerous ways of suitably supporting disk 10 will occur to those skilled in the art. As particularly illustrated in FIG. 1, disk 10 is supported around its nodal circle by being clamped between the coaxial ends of a pair of nonmagnetic cylinders 11 and 12 having very thin walls and circumferences that coincide with the nodal circle. Means are provided for applying a magnetic field to disk 10 in a direction normal to its surface. While disk 10 may be permanently magnetized in this direction, the embodiment illustrated includes magnetic pole pieces N and S bearing upon and forming the support for cylinders 11 and 12. Ultrasonic input-output connections are provided to disk 10 by the thin strips of elastic wave propagation material 14, 15 and 16 each rigidly connected to disk 10 at symmetrical points equally spaced by 120° around the disk periphery. Strips 14, 15 and 16 may be continuations of the material of disk 10. Preferably, however, they are formed from any isotropic material such as quartz, silica, aluminum or any metallic alloy which has a grain size that is small compared to the elastic wave length to be supported. These materials represent a limited number of examples of those customarily employed for elastic wave delay lines. In the particular embodiment illustrated in FIG. 1, each strip is excited in the flexural mode which has a particle displacement parallel to the thickness dimension of each strip as represented by vector 13 and parallel to the thickness dimension of disk 10. The other ends of guides 14, 15 and 16 are in turn connected to suitable sources of elastic wave vibration or to utilizing devices for said energy, depending upon the intended use of the circulator.

The operation of the circulator is such that elastic waves introduced at port 1, comprising guide 14, will be coupled to port 2, comprising guide 16, with no reflected waves at port 1 and no energy at port 3, comprising guide 15. If on the other hand wave energy is applied at port 2 it will appear at port 3 with none at port 1. Similarly, energy applied at port 3 will appear at port 1. The principles underlying this operation will be described first in a qualitative way to provide an intuitive understanding of the invention, and then in an analytical manner to supply further details concerning desirable parameters.

Referring therefore to FIG. 2, the dominant flexural mode in disk 10 is schematically illustrated as it would appear in the absence of a magnetic field. Thus, if the disk is excited by a vertical displacement at a point A as represented by vector 20, the disturbance travels as a pair of counter-rotating field patterns around the disk with equal velocities in either direction from point A. If the dimensions of the disk are such that it is near resonance at the frequency of the disturbance, the standing wave pattern of the dominant mode will be set up as represented by the vectors 21. Nodes will appear at points B and D, each 90° around the periphery from point A; a nodal diameter will connect points B and D; a node 23 will occur at the center of the disk; and a nodal circle 24 will surround point 23. Since any of these nodal regions are dead, disk 10 may be supported at point 23 or around nodal circle 24 without disturbing its vibration. Similarly, any output means connected at points B and D will receive no energy while an output means connected at or in the vicinity of point C will receive energy.

When a steady external magnetizing field is applied to disk 10 as represented schematically in FIG. 3 by the vector $H_{dc}$, the two counter-rotating wave patterns no longer have the same resonant frequency because the magnetoelastic interaction between the elastic waves and electron spins in the magnetized material modifies the effective elastic modulus for the opposite patterns in opposite senses. The resonant frequencies are now respectively above and below the exciting frequency and the phases of the counter-rotating waves are shifted relative to each other which in turn shifts the regions where in and out of phase relationships between them occur.

The effect of this is that the standing wave pattern, together with its nodal points B and D, is rotated as shown in FIG. 3 by an angle $\theta$ in an amount which depends upon the strength of $H_{dc}$. In accordance with a particular feature of the invention, $\theta$ is adjusted to equal 30° so that nodal point B is coincident with port 3 but nodal point D is remote from both ports 1 and 2. Thus, energy developed at port 1 couples into the standing wave pattern and is delivered to port 2 but none appears at port 3. The coupling is non-reciprocal, however, to the extent that any power entering port 3 will set up a new pattern having one node that coincides with port 2 and another remote from ports 1 and 3. This will result in power leaving port 1 while port 2 is isolated. In a similar manner, power entering port 2 is transmitted to port 3 and port 1 is isolated. Obviously, any two of the ports may be used together to produce an isolator and when this is done it is preferable to load the position of the unused port with any suitable elastic wave absorbing material.

The validity of the foregoing physical picture will now be demonstrated analytically. At the same time precise definitions of the dimensions of disk 10 and the strength of $H_{dc}$, for operation at a given frequency will be developed.

As derived by J. W. S. Rayleigh in "The Theory of Sound" volume 1, Dover Publications, 1945, flexural displacements $w$ at the periphery of a circular disk which is thin enough that coupling to thickness shear modes is small, may be given by $$w^{\pm}_{n,m}=A^{\pm}_{n,m}e^{j(\omega_{m,n}t\pm n\theta)} \quad (1)$$

where in the radial direction there are $m$ nodal diameters.

The resonant frequencies of the rotating flexural modes of a free disk (radius $a$) are degenerate and are given by $$\omega_{m,n}=\frac{\alpha_{m,n}}{a^2}\sqrt{\frac{\rho D}{h}} \quad (2)$$

where $D=8Eh^3/12(1-\sigma^2)$ is the "flexural rigidity" of the disk, $\alpha_{m,n}$ is a constant for each mode and $\sigma$, Poisson's ratio, is given by $\lambda/2(\lambda+\mu)$, where $\lambda$ and $\mu$ are the Lamé constants. E is Young's modulus and $h$ is the disk thickness. The displacement described above in connection with FIGS. 2 and 3 is for the $n=1$, $m=1$ mode.

The effect of the magnetization on the elastic properties of the medium can be represented by an effective shear elastic modulus. While the counter-rotating flexural modes are by no means simply defined, they are characterized by significant circularly polarized components the shear elastic modulii of which can be expressed:

$$\mu^{\pm}=\mu\left(1\pm\frac{\gamma B_2^2/M_s}{\omega\mp\omega_H}\right) \quad (3)$$

where $B_2$ is one of the two magnetoelastic coupling constants, $M_s$ is the saturation magnetization, $\gamma$ is the gyromagnetic ratio and $\omega_H/\gamma$ is the total internal D.C. field This results applies generally to polycrystals and for single crystals when the magnetic field is along the hard axis ([100] in most cubic ferromagnetic insulators). These elastic modulii are analogous to the circularly polarized permeabilities in the case of electromagnetic waves in ferrites.

The two counter-rotating flexural modes which are degenerate in the absence of magnetoelastic coupling will be split as a result of the different elastic modulii for the two senses of rotation.

An estimate of the natural resonant frequencies of the magnetically perturbed system can be found by assuming that the modes are everywhere circularly polarized so that Equations 2 and 3 can be combined to result in $$\frac{\omega^{\pm}}{\omega^{\circ}}=\left[1-\left(\frac{\sigma_o^2}{1-\sigma_o^2}\right)\frac{\Delta\mu^{\pm}}{\lambda+\mu_o}\right] \quad (4)$$

where $\mu=\mu_0+\Delta\mu^{\pm}$ is defined by Equation 3 and $\omega^{\circ}$ is the unperturbed resonant frequency of the mode (Equation 2). The lowest frequency flexural mode of interest is the $n=1$ mode with one nodal circle. The flexural mode with $n=1$ with no nodal circle is a rigid body motion and is therefore inapplicable for this analysis. If the frequency is adjusted to equal $\omega^+$ or $\omega^-$ and if the losses are small, i.e., $Q^{\pm}>>1$, where $Q^{\pm}$ is the loaded Q of the two modes than only the $\omega^+$ or $\omega^-$ modes respectively, will be appreciably excited. However, if the frequency is chosen to lie between $\omega^+$ and $\omega^-$ then, in general, both modes will be excited. In order for the disk motion not to couple to port 3 ($\theta=-120°$) it is necessary for the displacement $w$ to vanish there. In the case $n=1$ the displacement is then given by $$w=B\left(\cos\theta+\frac{\sin\theta}{\tan 120°}\right)e^{j\omega t} \quad (5)$$

where B is a complex phasor.

The displacements at the input and output ports are equal in magnitude, which is necessary for low insertion loss. From Equations 5 and 1 we find $$A^+=\frac{B}{2}\left(1+\frac{1}{j\tan 120°}\right)=0.578\ Be^{-j30°} \quad (6a)$$

$$A^-=\frac{B}{2}\left(1-\frac{1}{j\tan 120°}\right)=0.578\ Be^{j30°} \quad (6b)$$

Thus, the phases ($\varphi^{\pm}$) of the two normal modes differ by 60° ($\varphi^+=\varphi^--60°$) and their amplitudes are equal. The phases of the two normal modes cannot be specified without solving the detailed boundary value problem. However, if the two modes are equally coupled to the input-output devices and have identical loaded Q's the phase angles are equal and opposite, i.e., $\varphi^+=-30°$, $\varphi^-=30°$. These two conditions are equivalent to the statement that the two normal modes are off resonance by just 30°, one above and one below resonance. Thus the operating frequency lies between the two normal mode frequencies for the system to function as a circulator. The displacement for the $n=1$, $m=1$ mode under circulating conditions has been shown in FIG. 3 and should be compared to the pure elastic mode shown in FIG. 2. The maximum displacement is at $\theta=-30°$ and $\theta=150°$, i.e., 30° away from ports 1 and 2. Port 3 isolated as shown.

The bandwidth over which the circulator will function is limited by the splitting of the elastic modes by the magnetic field. This is the case since it is necessary for circulation for $\omega^{-}<\omega<\omega^{+}$. The bandwidth calculation will lead to a criterion for the selection of magnetic materials for this application.

From Equations 3 and 4 the mode splitting $$\frac{\Delta\omega}{\omega^{\circ}}=(\omega^{+}-\omega^{-})/\omega^{\circ}$$

can be evaluated, resulting in $$\frac{\Delta\omega}{\omega^{\circ}}=\frac{\sigma_o^2}{1-\sigma_o^2}\,\frac{\gamma B_2^2/M_s}{(\lambda+\mu_o)}\,\frac{2\omega_H}{\omega^2-\omega_H^2} \qquad (7)$$

The Poisson ratio for most ferrites is equal to approximately ⅓. In the case of yttrium iron garnet, $\lambda=11\times10^{11}d$ cm.$^{-2}$, $\mu=7.8\times10^{11}d$ cm.$^{-2}$ and $\sigma_o=0.292$. With these vaues for $\lambda$ and $\mu$, Equation 7 reduces to, using $\gamma=17.6\times10^6$oe.$^{-1}$sec.$^{-1}$, $$\frac{\Delta\omega}{\omega^{\circ}}=2.34\times10^{-6}\frac{B_2^2}{M_s}\left(\frac{\omega_H}{\omega^2-\omega_H^2}\right) \qquad (7')$$

If the term in the bracket is constant, a useful figure of merit for materials for this application is $B_2^2/M_s$. For a large splitting the operating frequency must not be too small with respect to $\gamma$ times the internal field ($H_{int}$). The shear modulii for the rotating modes are indistinguishable if $\omega<<\omega_H$ (see equation 3). At low frequencies appreciable splitting requires a low value of $H_{int}$. However, it is desirable from the standpoint of low elastic losses for the material to be saturated. For example, the Q of a shear mode in an yttrium iron garnet sphere decreases by two orders of magnitude when the D.C. field is reduced only 2 oe. below saturation. Because of the saturation condition two cases can be distinguished.

For magnetic saturation in polycrystals the D.C. field must be larger than the anisotropy field $2|K_1|/M_s$, where $K_1$ is the first order anisotropy constant (negative for most ferrites). For yttrium iron garnet $2|K_1|/M_s$ at 300° K. is 90 oe. This results in a minimum frequency of 250 mc./sec. for $\omega\approx\omega_H$.

In the case of single crystals the anisotropy field is a variable and can be partially canceled by the applied field when the orientation is along the hard magnetic axis ([100] in most cubic ferrimagnets). When the disk is oriented along [100] the internal field is given by $$H_{int}=H_o+H_d-2|K_1|/M_s \qquad (8)$$

where $H_o$ is the external field and the demagnetizing field for an ideal disk is $H_d=4\pi M_s$. The demagnetized external field ($H_o+H_d$) must be greater than $2|K_1|/M_s$ to maintain the alignment of $M_s$ with $H_{int}$. The difference between this demagnetized external field and $2|K_1|/M_s$ can be made small and in an ideal material with no coercive force it can be made zero.

To illustrate the potential bandwidth of this circulator using YIG the following example can be given:

$$\omega=2\pi\cdot10 \text{ mc./sec.}$$

$$H_{int}=5 \text{ oe.}$$

$$B_2=7\times10^6 \text{ erg cm.}^{-3}$$

$$4\pi M_s=1770 \text{ gauss}$$

A mode splitting $$\frac{\Delta\omega}{\omega^{\circ}}=1.9\%$$

is found from Equation 7′. The isolation bandwidth of the circulator is always smaller than the splitting, and thus, regardless of the method of coupling, the maximum bandwidth is 1.9%. By analogy with the electromagnetic circulator the stationary rotated mode will have a response at the input port similar to a lumped constant resonator with a loaded Q given by, $$Q_L=\frac{\tan 30°}{\Delta\omega/\omega^{\circ}}=30 \qquad (9)$$

The insertion loss of the circulator should be quite small since the unloaded Q for single crystal YIG resonators has been observed to be greater than $10^6$ at these frequencies. However, if the coupling is small so that $\omega_H$ must be close to $\omega$ for appreciable splitting it is also necessary for the ferromagnetic resonance line width to be small to avoid magnetoelastic losses.

While flexural modes in disk 10 appear to be uniquely suited for practicing the invention and are therefore preferred, flexural modes in the connecting elastic waveguides such as 14 are not necessarily compatible with the system in which the circulator is to be used. For example, both shear and compressional modes have been given considerable attention in the prior art, and either of these types can be coupled to the flexural mode in disk 10 as illustrated in FIG. 4A and FIG. 4B. In FIG. 4A strip guide 41 is assumed to be excited by shear wave vibrations having particle displacements parallel to the broad face of the strip. Strip 41 is therefore joined to disk 10 with this direction of particle displacement perpendicular to the plane of disk 10. Similarly, in FIG. 4B strip guide 42 is assumed to be excited by compressional mode vibrations having particle displacements parallel to the longitudinal axis of the strip. Strip 42 is therefore joined to disk 10 with this longitudinal axis perpendicular to the plane of disk 10.

The principle usefulness of the present invention is believed to reside in producing circulator action directly with elastic waves in an elastic wave system as, for example, to separate the input and output elastic signal in an elastic wave parametric amplifier. Recognizing, however, that present circulators for electromagnetic signals are limited to frequencies of at least 100 megacycles, the present invention can fill a definite need at frequencies below this value by being adapted with simple and conventional electric wave to elastic wave transducers as illustrated in FIG. 5A and FIG. 5B. In FIG. 5A a shear wave transducer 43 of conventional design is bonded upon the edge of disk 10 to replace one, two or all of the elastic waveguide inputs of FIG. 1. The vector 44 represents the shear mode transducer polarization which produces particle displacements consistent with the desired flexural mode in disk 10. In FIG. 5B a similar substitution is made with a compressional mode transducer 45 which is located upon the plane face of disk 10 adjacent to its edge to obtain the desired displacement coincidence.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A nonreciprocal coupling circuit for elastic wave energy comprising a magnetized member of ferromagnetic material having gyromagnetic properties, means at one point on the periphery of said member for exciting elastic wave vibrations in said member in a standing wave having spaced nodal points of vibration around said periphery, and means for coupling to elastic wave vibrations in said member at another point on said periphery that coincides with one of said nodal points.

2. The coupling circuit of claim 1 including additional means for coupling to elastic wave vibration in said member at a point symmetrically spaced with respect to said first point and said other point.

3. The coupling circuit of claim 1 wherein said member is a thin disk of yttrium iron garnet.

4. The coupling circuit of claim 3 including means for magnetizing said disk with an externally applied steady magnetic field in a direction normal to the plane of said disk.

5. In combination, a thin disk of ferromagnetic material having gyromagnetic properties, means at a plurality of spaced points around the periphery of said disk for coupling to and from flexural standing wave vibrations in said disk having spaced nodal points of vibration around said periphery, and means for applying a magnetic field to said disk of strength which causes coincidence between at least one of said coupling points and one of said nodal points.

6. The combination according to claim 6, wherein said means for coupling comprises three electromechanical transducers adapted to generate elastic waves of particle displacement in a given direction, said transducers being connected to said disk at equally spaced points with said given direction substantially aligned with the thickness of said disk.

7. The combination according to claim 6, wherein said means for coupling comprises three elastic waveguides adapted to support a mode of elastic wave propagation having particle displacements in a given direction, said guides being connected to said disk at equally spaced points with said given direction substantially aligned with the thickness of said disk.

8. The combination according to claim 7, wherein the strength of said field produces a rotation of the positions of said nodal points 30° around said periphery from their positions when said field is zero.

References Cited by the Examiner

UNITED STATES PATENTS

| | | | |
|---|---|---|---|
| 2,774,890 | 12/1956 | Semmelman | 333—1.1 X |
| 3,121,849 | 2/1964 | Matthews | 333—24.2 |

OTHER REFERENCES

Eshbach: Journal of Applied Physics, April 1963, pp. 1298–1304.

Comstock et al.: Journal of Applied Physics, May 1963, pp. 1461–1464.

HERMAN KARL SAALBACH, *Primary Examiner.*

P. L. GENSLER, *Assistant Examiner.*